(12) United States Patent
Nishida

(10) Patent No.: US 7,575,704 B2
(45) Date of Patent: Aug. 18, 2009

(54) METHOD OF MOLDING A HOLLOW ARTICLE

(75) Inventor: Shoso Nishida, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 667 days.

(21) Appl. No.: 11/117,529

(22) Filed: Apr. 29, 2005

(65) Prior Publication Data
US 2005/0255267 A1 Nov. 17, 2005

(30) Foreign Application Priority Data
Apr. 30, 2004 (JP) .............................. P2004-135056

(51) Int. Cl.
*B29C 45/13* (2006.01)
*B29C 65/18* (2006.01)
(52) U.S. Cl. ..................... 264/248; 264/250; 264/294
(58) Field of Classification Search ..................... None
See application file for complete search history.

(56) References Cited

U.S. PATENT DOCUMENTS 3,994,515 A * 11/1976 Cotten ..................... 285/21.2
4,752,350 A * 6/1988 Schuster ................... 156/379.6
4,869,616 A * 9/1989 Linnemeier ................. 403/270

FOREIGN PATENT DOCUMENTS

| JP | 62-87315 A | 4/1987 |
|----|------------|--------|
| JP | 63-237918 A | 10/1988 |
| JP | 6-246781 A | 9/1994 |
| JP | 6-305028 A | 11/1994 |
| JP | 7-16945 A | 1/1995 |
| JP | 10-166449 A | 6/1998 |
| JP | 11-221858 A | 8/1999 |

* cited by examiner

*Primary Examiner*—Edmund H. Lee
(74) *Attorney, Agent, or Firm*—Sughrue Mion, PLLC

(57) ABSTRACT

First and second semi-finished molded articles and a third semi-finished molded article are molded simultaneously so as to have joint end faces by using a slide die, a fixed die, and first and second slide cores fitted to the fixed die. The slide die with the third semi-finished molded article remaining thereon is moved toward the first and second slide cores, and their respective joint end faces are registered. Heating surfaces are inserted between the joint end faces. After melting the joint end faces, the heating surfaces are retracted, and the molding device is closed to weld the joint end faces.

4 Claims, 7 Drawing Sheets

METHOD OF MOLDING A HOLLOW ARTICLE

This application is based on Japanese Patent Application No. 2004-135056, which is incorporated herein by reference.

BACKGROUND OF THE INVENTION

1. Field of the Invention

The present invention relates to a method of molding a hollow molded article in which, in primary molding, semi-finished molded articles which make a pair are molded simultaneously so as to have joint faces by using a fixed die and a movable die capable of closing a molding device and, in secondary molding, the movable die with one semi-finished molded article remaining thereon is moved with respect to the fixed die to thereby cause the one semi-finished molded article to be superposed on the other semi-finished molded article so that their respective joint faces are opposed to each other, and the superposed joint faces are welded by closing the movable die with respect to the fixed die or by pressing the semi-finished molded articles in a molding device, thereby obtaining a hollow molded article from the semi-finished molded articles, as well as the hollow molded article, and an apparatus for manufacturing the same.

2. Description of the Related Art

A molding method using an injection molding machine is known as one method of manufacturing a synthetic resin-made hollow molded article which is obtained by complex joining, including a bent pipe, an intake manifold, a tank, and the like. This injection molding machine consists of a set of molding devices, as also shown in JP-A-62-87315 and JP-A-6-246781. A male die and a female die for forming one hollow molded article are provided in one molding device of the set of molding devices, while a female die and a male die for forming the other hollow molded article are provided in the other molding device. Accordingly, if, by using these molding devices, hollow products are formed as two split semi-finished hollow articles or split articles in primary molding, and their split surfaces are abutted against each other and a molten resin is injected and filled into the abutted joint space in secondary molding, the pair of semi-finished hollow articles are produced as one hollow product in which they are joined at the split surfaces. As a result, the hollow molded article can be manufactured by injection molding. According of this molding method using the injection molding machine, there are advantages in that it is possible to fabricate a hollow product which is completely sealed and fabricate a hollow product with a uniform thickness, and that it is possible to cope with complex shapes. However, since a molten resin for joining must be injected in secondary molding, the structure of the injecting machine becomes long or a long molding time is required, or the structure of the molding device becomes complex. Furthermore, if the secondary injection pressure is small, the joining force is weak, whereas if it is large to the contrary, there is a possibility of the molten resin leaking from the joint space to the interior of the hollow product.

Further, JP-A-6-305028 discloses a manufacturing method in which a tubular first member made of a thermoplastic resin and a similar tubular second member made of a thermoplastic resin are opposed to each other, an electrically conductive member is clamped by the opposing end faces, and the end faces are welded by subjecting the electrically conductive member to induction heating, thereby manufacturing a tubular article. In addition, the following method of manufacturing a hollow product is shown in JP-A-7-16945. Namely, in primary molding, first and second semi-finished hollow articles are molded simultaneously by using a slide die and a movable die so as to have joint portions. Then, in secondary molding, the slide die is slid upwardly with respect to the movable die, and one of the first and second semi-finished hollow articles molded in the primary molding is superposed on the other semi-finished hollow article such that their joint portions are opposed to each other. The inner surface sides of the joint portions of the superposed first and second semi-finished hollow articles are heated by a heater, or are heated by hot air so as to melt partially. Then, the joint portions are pressed and welded by a pressing member, thereby obtaining a hollow product from the first and second semi-finished hollow articles.

According to the invention disclosed in JP-A-6-305028, since it is unnecessary to inject a molding resin for joining when the end faces of the first and second members are joined, there is an advantage in that the injecting machine or the injection operation becomes simple. However, since foreign objects are embedded in the joint faces, there are also problems. For example, since the embedded electrically conductive member is made of a metal, there are cases where it exhibits a shielding effect with respect to radio waves, and cases where it generates heat, so that applications are sometimes limited. Furthermore, since the metallic electrically conductive member is interposed or embedded at the joint faces, i.e., since the joining is not that between synthetic resins, but that of different materials, i.e., a metal and a synthetic resin, the joining force can possibly be weak. In addition, although the JP-A-6-305028 does not especially show an apparatus used for carrying out the respective methods of molding the first and second members or for carrying out the method of joining the first and second members, it is supposed that the first and second members after being removed from the molding device are joined by using a special apparatus. Hence, these first and second members are likely to be affected by disturbances, and there are cases where their temperatures, shapes, and the like undergo change over time, possibly resulting in a decline in the precision of the molded product. In addition, it is estimated that the manufacturing process is made complex.

According to the invention described in JP-A-7-16945, since the inner sides of the joint portions are heated and welded in a state in the first and second semi-finished hollow articles are placed in the molding device, advantages are obtained in that the outer sides of the joint portions are not melted and deformed, and that only portions necessary for joining are melted, so that energy for melting can be small. Furthermore, since the secondary molding for joining the pair of semi-finished hollow articles is carried out by using the same molding device used in the primary molding for molding the pair of semi-finished hollow articles, there are advantages in that the apparatus for manufacturing a high-precision hollow product is inexpensive and that the hollow product can be manufactured at low cost. However, since the heater is embedded, the above-described problems are encountered. In addition, since the heater is in the form of wires, there is no guarantee that the end faces which are joined are uniformly melted. On the other hand, according to the method of joining by melting by hot air, since the hot air is large in compressibility and has a small heat capacity, it is estimated that it is technically difficult to supply hot air uniformly over the entire areas of the joint portions and to uniformly melt them. In addition, since the molten joint portions are adapted to be pressed and welded by a pressing member which is especially prepared, a higher cost of the manufacturing apparatus can result.

SUMMARY OF THE INVENTION

The present invention has been devised in view of the above-described problems, and specifically its object is to provide a method of molding a hollow molded article in which the strength of the joint portions of the semi-finished hollow articles is sufficiently large, which is free of the problem of injection that the molding process becomes complex during secondary molding, the problem of selection of resin, and the like, and which does not especially require a pressing member for pressing and contact bonding the joint portions, as well as an apparatus for manufacturing the same. Another object of the invention is to provide an inexpensive hollow molded product which has large bonding strength despite the fact that a plurality of semi-finished molded articles are joined.

To attain the above object, the manufacturing process in accordance with the invention consists of primary molding and secondary molding. In the primary molding, semi-finished molded articles which make a pair or a plurality of semi-finished molded articles are molded simultaneously so as to have joint faces. The joint faces are then melted and contact bonded in the secondary molding. During this secondary molding, a heating module having heating surfaces, preferably a heating module having heating surfaces similar to the joint faces, is inserted between the joint faces, and the joint faces are melted uniformly. Then, after the heating module is retracted, the joint faces are contact bonded. The contact bonding is arranged to be performed by a clamping apparatus used in the primary molding. Thus, to attain the above objects, in accordance with a first aspect of the invention, there is provided a method of molding a hollow molded article, comprising molding a pair of semi-finished molded articles each of which has a joint face to be jointed by using a molding device including a fixed die and a movable die capable of closing the molding device, moving the movable die in which one of the semi-finished molded articles remain with respect to the fixed die so that the respective faces of the semi-finished molded articles are opposed to each other, inserting a heating module having heating surfaces between the joint faces of the semi-finished molded articles, causing the heating module to melt the joint faces and retracting the heating module, and press bonding the joint faces by closing the molding device or pressing the semi-finished molded articles inside the molding device.

In accordance with a second aspect of the invention, there is provided a method of molding a hollow molded article, comprising molding first to third semi-finished molded articles each of which has a joint face to be jointed by using a molding device including a fixed die, a movable die capable of closing the molding device, and a pair of slide cores fitted to the fixed die, moving the movable die in which the third semi-finished molded article remains is moved with respect to the slide cores on the fixed die so that the respective faces of the semi-finished molded articles are opposed to one another, spacing apart the joint faces of the first to third semi-finished molded articles, inserting a heating module having heating surfaces between the joint faces, causing the heating module to melt the joint faces and retracting the heating module, and press bonding the joint faces by closing the molding device or pressing the semi-finished molded articles inside the molding device.

In accordance with a third aspect of the invention, in the molding method according to the first or second aspect, the heating surfaces similar to the joint faces are inserted between the joint faces in a non-contact manner to melt the joint faces. In accordance with a fourth aspect of the invention, there is provided a hollow molded article comprising a plurality of semi-finished molded articles which are molded to have joint faces in primary molding, and a heating module having a heating surface, wherein the joint faces are melted and contact bonded at the joint faces by the closing of a same molding device as that used in the primary molding or by pressing the semi-finished molded articles inside the molding device, and wherein the joint faces are melted and contact bonded after the heating module heats and melts the joint faces and is retracted.

In accordance with a fifth aspect of the invention, there is provided an apparatus for molding a hollow molded article, comprising a combination of a molding device and a heating module, the molding device including a fixed die, a movable die, and a first and a second slide core fitted to the fixed die, wherein if the movable die is clamped to the fixed die at a first position, a first and a second cavity for simultaneously molding a first and a second semi-finished molded article having joint faces are formed by the first and the second slide core and the movable die, and a third cavity for simultaneously molding a third semi-finished molded article similarly having joint faces is formed by the fixed die and the movable die, wherein if the movable die is moved by a predetermined amount toward the first and the second slide core, the first to third cavities are registered with each other, and at a registered second position surfaces making up the first to third cavities are adapted to be spaced apart so as to secure a space of a predetermined size and to effect molding device clamping, and wherein the heating module has heating surfaces similar to the joint faces of the first to third semi-finished molded articles and is provided in such a manner as to be capable of being inserted into or retracted from the space formed by the spaced-apart surfaces making up the first to third cavities.

As described above, in accordance with the invention, the arrangement provided is such that in primary molding, semi-finished molded articles which make a pair are molded simultaneously so as to have joint faces by using a molding device including a fixed die and a movable die capable of closing the molding device and, in secondary molding, the movable die with one semi-finished molded article remaining thereon is moved with respect to the fixed die to thereby cause the one semi-finished molded article to be superposed on another semi-finished molded article so that their respective joint faces are opposed to each other, so as to obtain a hollow molded article from the semi-finished molded articles which make a pair by joining the superposed joint faces. A heating module having heating surfaces is inserted between the joint faces of the semi-finished molded articles before completion of a molding device closing step, and the then heating module melts the joint faces and retracts. The molding device is closed or the semi-finished molded articles are pressed inside the molding device are so as to melt and contact bond the joint faces. Namely, since the secondary molding is carried out by using the same molding device without removing the semi-finished molded articles from the molding device used in the primary molding, it is unnecessary to transfer the semi-finished molded articles to a welding jig. Since the adjustment of the jig by taking into account a change in the shrinkage over time of the semi-finished molded articles is made unnecessary, it is possible to easily manufacture a hollow molded article excelling in precision. In addition, since the adjustment of the welding jig is not required, another advantage is obtained in that fusion strength becomes uniform. More particularly, according to a related hot plate welding method, the molded article must be inserted in a welding jig after the molded article is removed from the molding device. However, if the molded article is removed from the molding device, the molded article undergoes deformation, so that the insertion becomes difficult. As a result, the welding of a molded article whose joint surface is curved becomes difficult, so that the related hot plate welding method is frequently used in the welding of molded articles whose joint surfaces are flat. According to the invention, however, since heating is effected in the molding device used in the primary molding, it is possible to obtain a hollow molded article with high dimensional accuracy without being affected by the shape of the joint surfaces.

In particular, according to the invention, the heating module having the heating surfaces is inserted between the joint faces of the semi-finished molded articles, is caused to melt the joint faces, and is retracted. The molding device is then closed or the semi-finished molded articles are pressed inside the molding device to melt and contact bond the joint faces. Therefore, it is possible to obtain advantages peculiar to the invention in that foreign objects are absent between the joint faces, the resins are joined, and a hollow molded article whose joint portions have large strength is obtained from semi-finished molded articles. At this juncture, since heating is effected in the state in which the semi-finished molded articles remain in the molding device, control of the position of the heating module is accurate. In addition, since the joint faces are heated by the heating surfaces, melting and contact bonding occurs over the overall surfaces of the joint faces. Furthermore, since heating is effected in the state in which the semi-finished molded articles remain in the molding device, welding can be allowed to take place before the semi-finished molded articles completely solidify. Hence, a hollow molded article can be manufactured by saving energy.

In addition, the manufacturing method according to the invention is free of the problem of injection that the molding process becomes complex during secondary molding, the problem of selection of resin, and the like, and a pressing member for pressing and contact bonding the joint portions is not especially required. Therefore, the hollow molded article can be manufactured at low cost.

The hollow molded article according to the invention is one in which a plurality of semi-finished molded articles molded to have joint faces in primary molding are melted and contact bonded at the joint faces by the closing of the same molding device as that used in the primary molding or by pressing the semi-finished molded articles inside the molding device. The hollow molded article comprises a heating module having heating surfaces for heating and melting the joint faces, wherein the joint faces are melted and contact bonded after the heating module heats and melts the joint faces and is retracted. Therefore, despite the fact that a plurality of semi-finished molded articles are joined, the bonding strength is large, and precision is high.

BRIEF DESCRIPTION OF THE DRAWINGS

FIGS. 1A to 1D are diagrams illustrating an embodiment of the invention, in which FIG. 1A is a perspective view illustrating an example of a hollow molded article (curved pipe), FIG. 1B is a cross-sectional view illustrating an apparatus for manufacturing the hollow molded article with a molding device closed in accordance with a first embodiment, and FIGS. 1C and 1D are cross-sectional views taken in the direction of arrows along line C-C and line D-D, respectively, in FIG. 1B;

FIGS. 3A and 3B are diagrams illustrating other examples of hollow molded articles in accordance with the embodiments, in which FIG. 3A is a front elevational view illustrating a first other example, and FIG. 3B is a cross-sectional view illustrating a second other example;

FIGS. 4A and 4B are diagrams illustrating an apparatus for manufacturing a hollow molded article in accordance with a second embodiment, in which FIG. 4A is a cross-sectional view illustrating a state in which the molding device is closed, and FIG. 4B is a cross-sectional view illustrating a state in which the hollow molded article is being manufactured with the heating module inserted.

DETAILED DESCRIPTION OF THE PREFERRED EMBODIMENTS

Figure 1A:
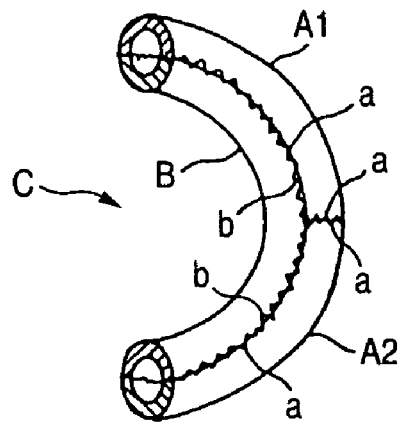
Figure 1C:
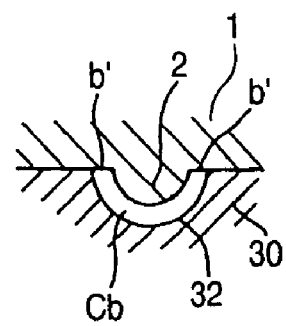
Figure 1D:
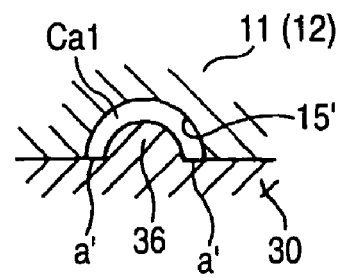
Figure 1B:
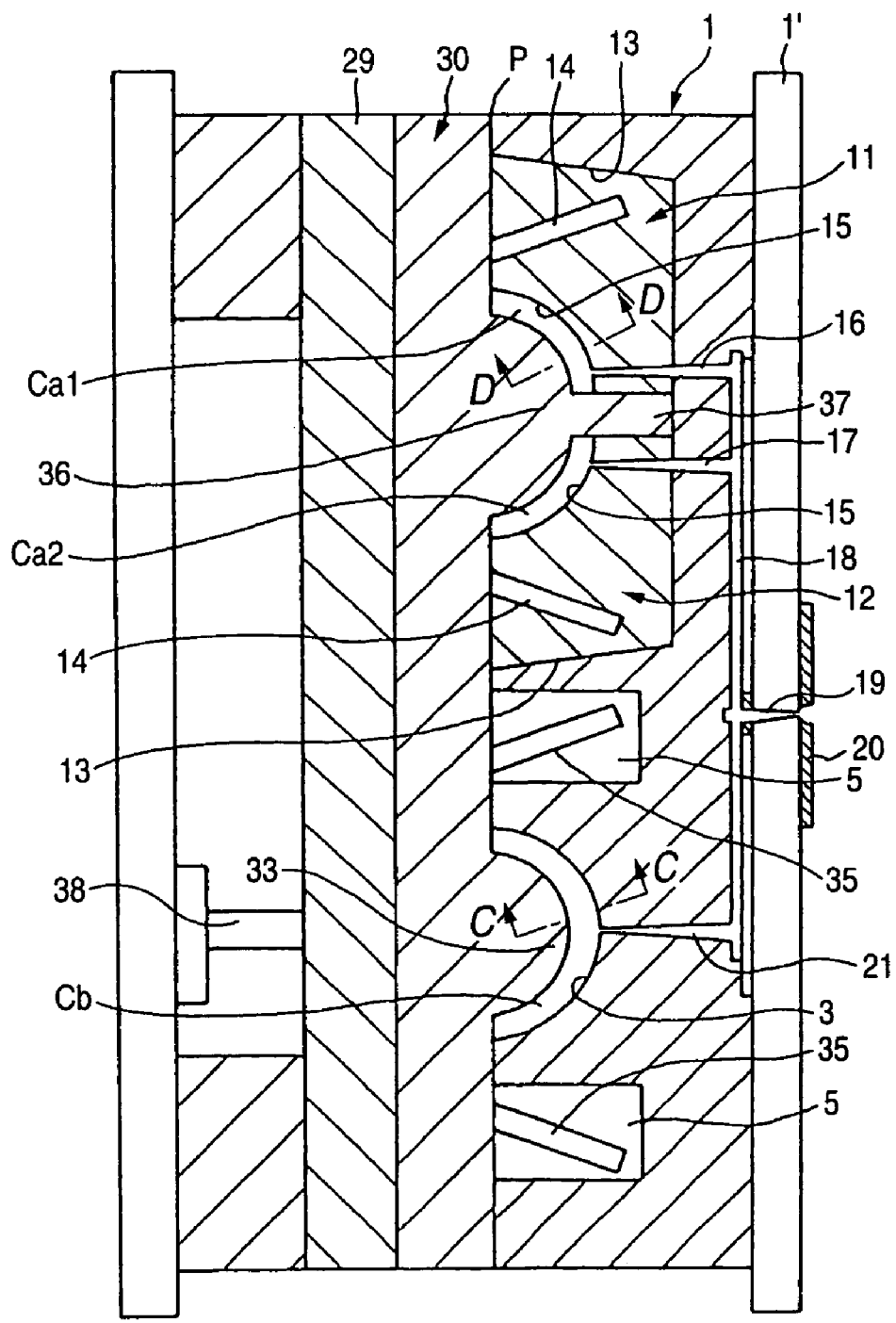

First, a description will be given of an apparatus for manufacturing a curved pipe C in which first and second semi-finished molded articles A1 and A2 which, as seen in a side view, occupy about one-fourth of a circumference and a semi-circular arc-shaped third semi-finished molded article B are joined at their joint faces a and b, and a and a, and have a semicircular arc shape as a whole, as shown in FIG. 1A. A manufacturing apparatus in accordance with a first embodiment for manufacturing or molding the curved pipe C is shown in FIG. 1B in a state in which its molding device is closed. This manufacturing apparatus is roughly comprised of a fixed die 1; a movable die 29 which is opened or closed with respect to this fixed die 1; a slide die 30 provided on the movable die 29 in such a manner as to be capable of being slidingly driven in the vertical direction in FIG. 1B; and a pair of first and second slide cores 11 and 12 which are mounted in a recess of the fixed die 1 in such a manner that their open surfaces are in alignment with a parting line P when the molding device is clamped. Although the apparatus for manufacturing a hollow molded article in accordance with this embodiment has a heater, which will be described later in detail, this heater is not shown in FIG. 1B. It should be noted that a clamping apparatus for clamping the movable die 29 with respect to the fixed die 1 is not shown, either.

A recess 3 of a predetermined size, which is recessed in the inward direction from the parting line P, is formed at a lower position in the fixed die 1 in FIG. 1B. This recess 3 is for molding an inner peripheral surface of the third semi-finished molded article B. Although this recess 3 as a whole is shown as being curved in FIG. 1B, this portion is specifically constituted by a small convex portion 2, as shown in FIG. 1C. Since this convex portion 2 is curved as a whole, this portion is shown as the recess 3 in the cross-sectional view of FIG. 1B. A pair of void spaces 5 of a predetermined size, in which a pair of inclined pins 35 are respectively accommodated during primary molding, are formed on both sides of the recess 3.

The pair of first and second slide cores 11 and 12 are fitted in an upper portion of the fixed die 1 in such a manner as to be movable in the left and right direction in FIG. 1B, i.e., in the direction toward and away from the parting line P, and in the vertical direction. These first and second slide cores 11 and 12 as a whole have a substantially trapezoidal shape in a side view, and their outwardly-facing side surfaces are formed as tapered surfaces 13 which are widened toward the parting line P side. A pair of guide holes 14 which are inclined in the opposite direction to the tapered surface 13 are respectively provided in the first and second slide cores 11 and 12. Accordingly, as will be explained in the section on the operation, if the slide die 30 is opened with the inclined pins 35 of the slide die 30 entered in the guide holes 14, the interval between the first and second slide cores 11 and 12 becomes greater due to the action of the inclined surfaces 13 when the first and second slide cores 11 and 12 are drawn out from the fixed die 1. A pair of recesses 15 having the shape of a circular arc of about one-fourth of a circumference are respectively formed in corner portions facing the parting line P side of the first and second slide cores 11 and 12 thus constructed. FIG. 1D is a cross-sectional view taken in the direction of arrows along line D-D in FIG. 1B. As shown in this drawing, these recesses 15 are constituted by small recesses 15' for molding outer peripheral surfaces of the first and second semi-finished molded articles A1 and A2, and ends of these recesses 15' are shown as the recesses 15 in FIG. 1B.

Unillustrated gates, which communicate with first and second sprues 16 and 17, are respectively open in upper portions of the recesses 15 constructed as described above. These first and second sprues 16 and 17 communicate with a resin hole of a locating ring 20 of a fixing die mounting plate 1' through a runner 18 and a main sprue 19 which are formed between the fixed die 1 and the fixed die mounting plate 1'. In addition, the runner 18 extends downward as well, and a sprue 21 communicating with this runner 18 is open in an apex portion of the recess 3 of the fixed die 1 through an unillustrated gate. The main sprue 19, the runner 18, and the sprues 16, 17, and 21 are for primary molding, and runners, sprues, and the like for secondary molding are not provided in this embodiment. Therefore, the molding device has a simple structure.

A semicircular arc-shaped core 33, which projects from the parting line P toward the fixed die 1 and makes a pair with the recess 3 of the fixed die 1, is provided on the parting line P side of the slide die 30 on the lower side in FIG. 1B. This core 33 is for molding an outer surface of the third semi-finished molded article B, and is constituted by a recess 32, as shown in FIG. 1C. However, since this recess 32 is curved, it is shown as the core 33 in the cross-sectional view of FIG. 1B. The pair of inclined pins 35 are attached to this core 33 with a predetermined interval provided in the vertical direction in such a manner as to project toward the respective void spaces 5 in the fixed die 1 and to be inclined away from each other. These inclined pins 35 are provided at the same angle as that of the guide holes 14 respectively formed in the first and second slide cores 11 and 12.

A core 36, which makes a pair with the recesses 15 of the first and second slide cores 11 and 12, is provided on an upper portion of the slide die 30 in such a manner as to project from the parting line P toward the fixed die 1. A spacer portion 37 is provided integrally on an apex portion of this core 36. The interval between the first and second slide cores 11 and 12 is widened by this spacer portion 37, and their tapered surfaces 13 are respectively brought into contact with the tapered surfaces of the fixed die. It should be noted that reference numeral 38 in FIG. 1B denotes an ejector or an ejector pin for ejecting the molded article.

Figure 2:
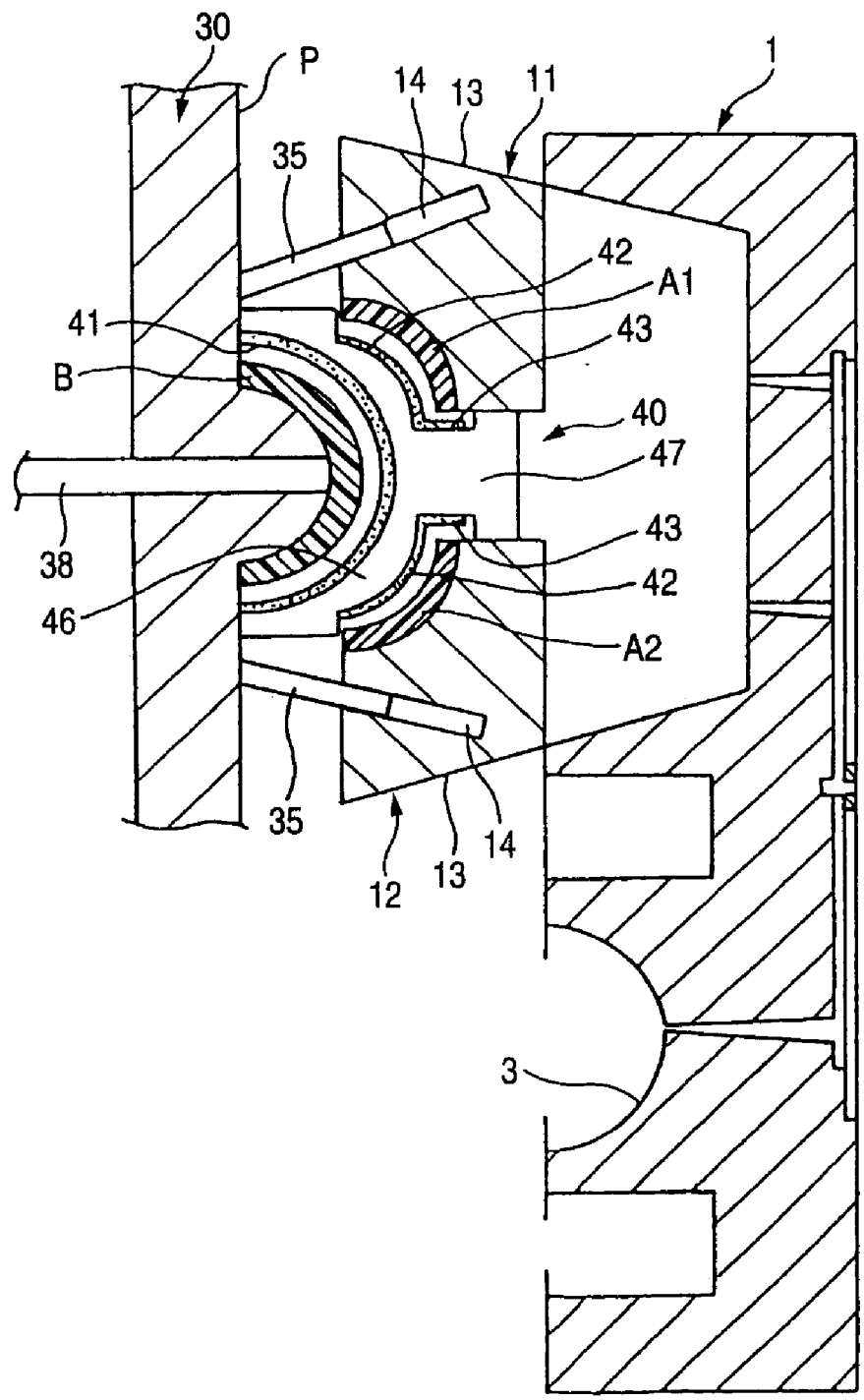
FIG. 2 is a cross-sectional view illustrating a state in which the hollow molded article is being manufactured with a heating module inserted in accordance with the first embodiment.

According to this embodiment, as shown in FIG. 2, a heating module 40 is also provided for heating and melting the joint faces a and b of the first to third semi-finished molded articles A1, A2, and B. This heating module 40 is comprised of first and second heating surfaces 41 and 42 formed by planar heaters constituted by such as sheathed heaters, ceramic heaters, and induction heaters, as well as a heating surface holder for holding these heating surfaces 41 and 42. The heating surface holder is formed by a bowl portion 46 which is curved in a side view and a spacer portion 47 projecting from an apex portion of this bowl portion 46. The first heating surface 41 is fitted to the inner surface of the bowl portion 46, and the second heating surfaces 42 are fitted to the outer peripheral surface thereof. The second heating surfaces 42 have heating extended surfaces 43 which extend toward the spacer portion 47. According to this embodiment, as for the heating module 40, its heating surfaces 41 and 42 have shapes such as those shown in FIG. 2 since the molded article is the curved pipe C. However, the first heating surface 41 corresponds to ends of a cavity Cb indicated by reference characters b' and b' in FIG. 1C, while each of the second heating surfaces 42 corresponds to ends of a cavity Ca1 indicated by reference characters a' and a' in FIG. 1D. In addition, the heating extended surfaces 43 are adapted to melt the joint faces a shown in FIG. 1A.

Figure 5:
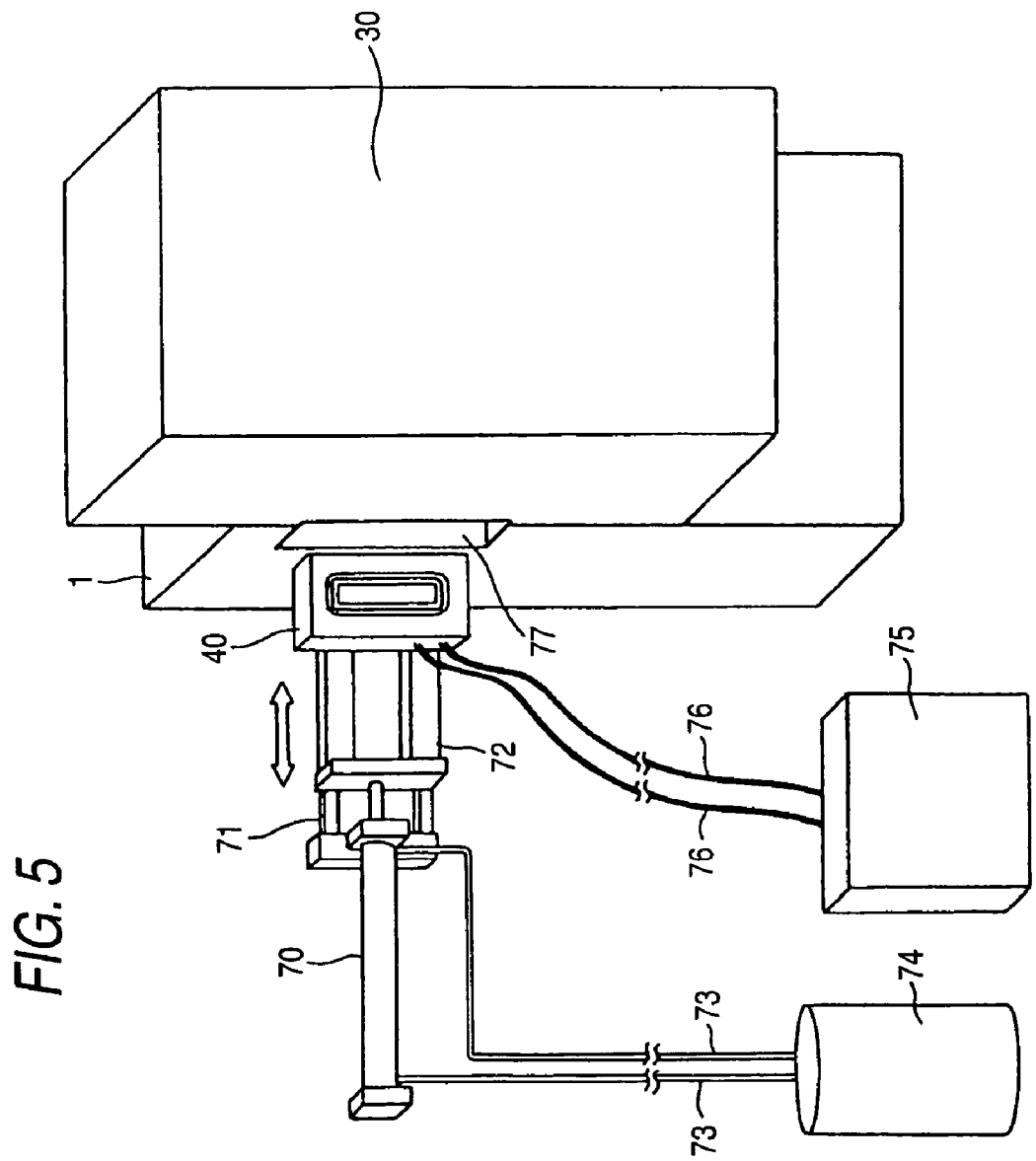
FIG. 5 is a perspective view schematically illustrating an example of an apparatus for driving the heating module.

An example of a driving apparatus for inserting the heating module 40 thus constructed between the fixed die 1 and the slide die 30 or retracting it from therebetween is shown in FIG. 5. Namely, the driving apparatus shown in FIG. 5 is comprised of, among others, a pair of guide rails 71 mounted on a side portion of the fixed die 1; a supporting frame 72 which is guided by the guide rails 71; a hydraulic piston/cylinder unit 70 for driving this supporting frame 72; and a hydraulic power source for supplying or discharging working oil to or from the hydraulic piston/cylinder unit 70 through supply and discharge hoses 73. Further, the heating module 40 is mounted on a distal end of the supporting frame 72. This heating module 40 is provided with the above-described heaters, and electric power is adapted to be fed to these heaters through cables 76 at all times or when the temperature has dropped to a predetermined level. In addition, a heating module insertion port 77 is provided in side portions of the fixed die 1 and the slide die 30. Accordingly, when working oil is supplied to or discharged from the hydraulic piston/cylinder unit 70 in interlocking relation to the movement of the slide die 30, the heating module 40 is inserted into the gaps between the joint faces a and b, and a and a, or is retracted to the position shown in FIG. 5.

It should be noted that an arrangement may be provided such that the heating module 40 is attached to, for example, an arm of a robot and is inserted into or retracted from the gaps between the fixed die 1 and the slide die 30, i.e., the gaps between the joint faces a and b, and a and a, in interlocking relation to the movement of the slide die 30. Such a robot, however, is not shown in the drawing.

Next, a description will be given of a molding method for manufacturing the curved pipe C made of a synthetic resin by using the above-described manufacturing apparatus. The slide die 30 is slidingly driven to a primary molding position, i.e., the position shown in FIG. 1B, and is clamped by an unillustrated clamping apparatus. Then, the third cavity Cb for molding the third semi-finished molded article B is formed by the recess 3 of the fixed die 1 and the core 33 of the slide die 30. At the same time, the first cavity Ca1 for molding the first semi-finished molded article A1 is formed by the recess 15 of the first slide core 11 and the core 36 of the slide die 30, and a second cavity Ca2 for molding the second semi-finished molded article A2 is formed by the recess 15 of the second slide core 12 and the core 36 of the slide die 30.

A plasticized molten resin is injected from a nozzle of an unillustrated injection machine into a main sprue 19. The molten resin is substantially simultaneously filled into the respective cavities Cb, Ca1, and Ca2 through the gates from the runner 18 and the first, second, and third sprues 16, 17, and 21. As a result, the first and second semi-finished molded articles A1 and A2 and the third semi-finished molded article B are molded substantially simultaneously. The semi-finished molded articles are left in the molding device as they are until they cool and solidify to some degree. This completes the primary molding.

Next, the movable die 29, i.e., slide die 30, is opened. When the die is opened, depending on the shapes and areas of the semi-finished molded articles A1, A2, and B or the presence or absence of projections, the first and second semi-finished molded articles A1 and A2 respectively remain in the first and second slide cores 11 and 12, while the third semi-finished molded article B remains on the slide die 30. The slide die 30 is subsequently slid to a second position on the upper side in FIG. 1B. Then, the joint faces a and b, and a and a, of the first and second semi-finished molded articles A1 and A2 and the third semi-finished molded article B are registered. Temporary clamping is effected. As a result of this temporary clamping, the inclined pins 35 enter the guide holes 14 of the first and second slide cores 11 and 12. Then, the slide die 30 is opened by a predetermined amount. As a result, the slide die 30 is opened with a predetermined amount with respect to the first and second slide cores 11 and 12, i.e., the parting line P. In addition, the first and second slide cores 11 and 12 are driven in mutually opening directions by the action of the inclined pins 35, and are opened by a predetermined amount. Namely, the joint faces a and a between the first and second semi-finished molded articles A1 and A2, as well as the joint faces a and b between, on the one hand, the first and second semi-finished molded articles A1 and A2 and, on the other hand, the third semi-finished molded article B, are spaced apart with predetermined intervals. At this juncture, working oil is supplied to the hydraulic piston/cylinder unit 70. Then, the heating module 40 is inserted between the joint faces a and b, and a and a. The joint faces a and b, and a and a, are heated and melted in a non-contact manner. Alternatively, after the heating module 40 is inserted, the intervals between the heating surfaces 41, 42, and 43 and the joint faces a and b are narrowed so as to perform heating and melting effectively.

The state in which the heating module 40 is thus inserted or is heating is shown in FIG. 2. After the joint faces a and b, and a and a, are melted, the heating module 40 is drawn out, and the molding device is clamped. As a result of this clamping force, the first and second semi-finished molded articles A1 and A2 and the third semi-finished molded article B are welded at their joint faces a and b. At the same time, the first and second slide cores 11 and 12 are driven in mutually approaching directions by the action of the inclined pins 35, so that the first and second semi-finished molded articles A1 and A2 are welded at their joint faces a and a. The slide die 30 is opened after the semi-finished molded articles are cooled and solidified. Then, the curved pipe C shown in FIG. 1A projects by means of the ejector 38. The slide die 30 is slid to the first position shown in FIG. 1B, and primary molding is carried out, as described above. Thereafter, the curved pipe C is manufactured in the same way.

Figure 3A:
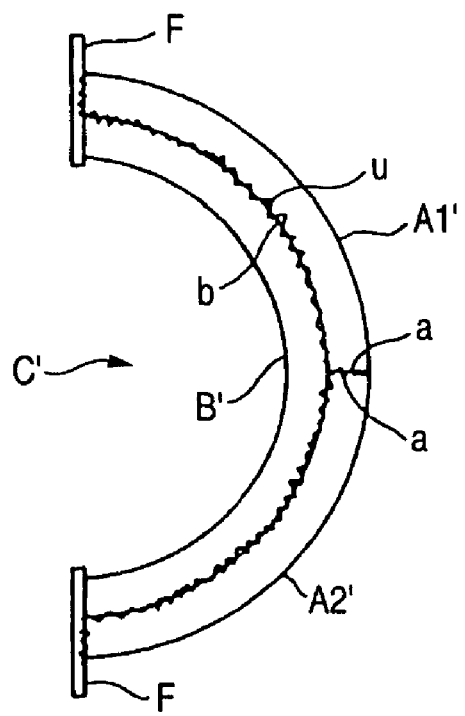

Next, a description will be given of a second embodiment of the invention with reference to FIGS. 4A and 4B. Although the curved pipe C shown in FIG. 1A can also be manufactured according to the second embodiment, a description will be given of an example of manufacturing a curved pipe C' having flanges F at its both ends from first and second semi-finished molded articles A1' and A2' and a third semi-finished molded article B', as shown in FIG. 3A. It should be noted that those elements similar to the component elements of the above-described first embodiment will be denoted by the same reference numerals, or the same reference numerals will be appended with a prime mark ('), and a redundant explanation will be omitted. The manufacturing apparatus in accordance with the second embodiment has a pair of slide cores 11' and 12' which are embedded in a fixed die 1' at a predetermined angle. These first and second slide cores 11' and 12' have first and second piston/cylinder units 51 and 52 which operate hydraulically or pneumatically. First and second cores 53 and 54 are adapted to be driven in the directions of open arrows by these piston/cylinder units 51 and 52. A first cavity Ca1' for molding the first semi-finished molded article A1' is formed by a distal end portion of the first core 53 and a core 36' of a slide die 30', and a second cavity Ca2' for molding the second semi-finished molded article A2' is formed by a distal end portion of the second core 54 and the core 36' of the slide die 30'. A pair of recesses 55 for molding the pair of flanges F are formed in peripheries of a core 33' of the slide die 30'.

Figure 4A:
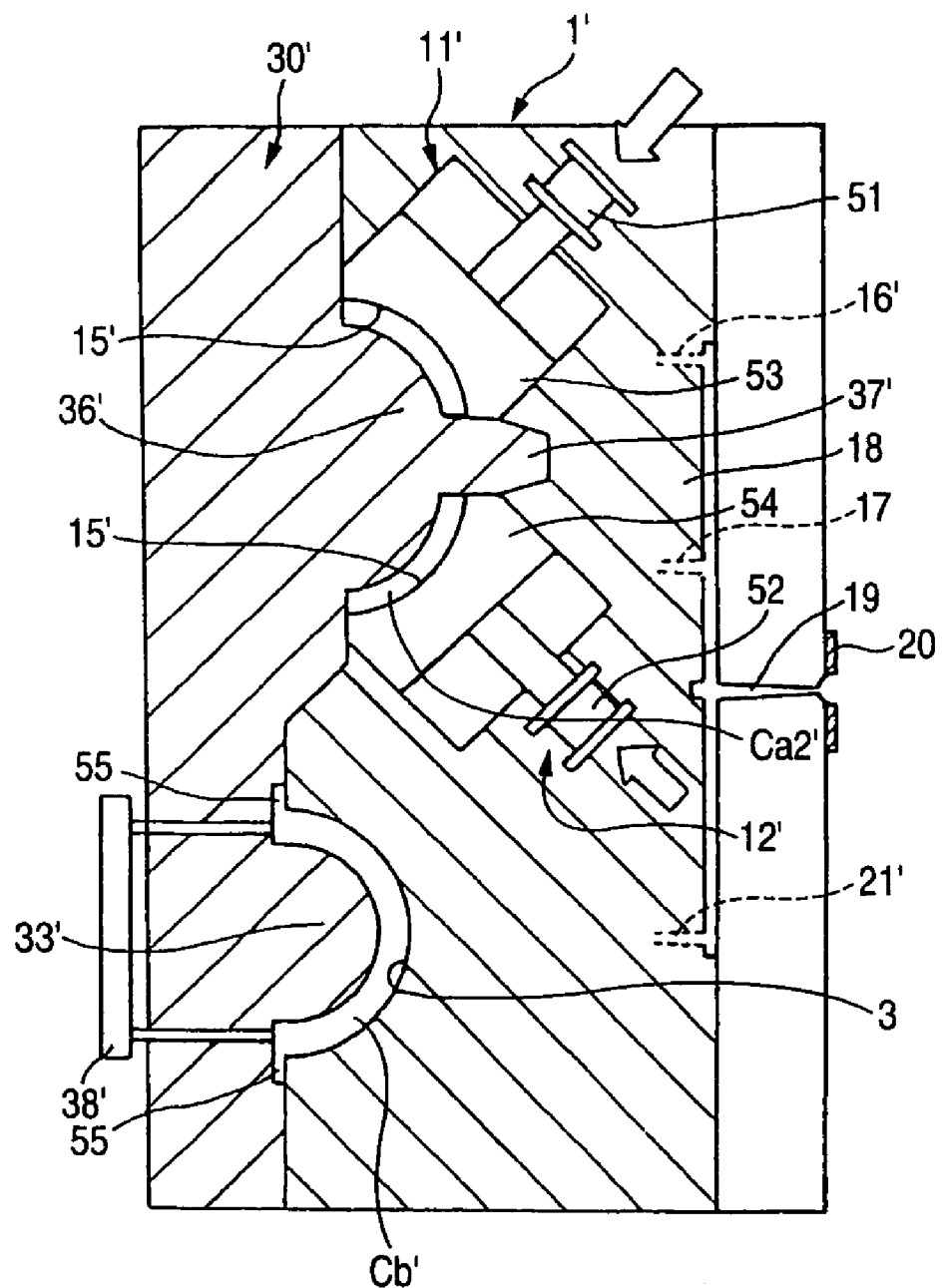

According to this embodiment, the gates are so-called tab gates which are open to the first to third cavities Ca1', Ca2', and Cb' through tabs provided on the end faces of these cavities Ca1', Ca2', and Cb', runners 16', 17', and 21' do not appear in FIG. 4A. In addition, as for a heating module 40', the heating module 40' itself makes up heating surfaces.

According to the second embodiment as well, molding can be performed in a manner similar to that of the above-described embodiment, so that a detailed description will not be given. The slide die 30' is slid to the first position for primary molding shown in FIG. 4A. Working oil is supplied to the first and second piston/cylinder units 51 and 52 to drive the first and second cores 53 and 54 to the position shown in FIG. 4A, and clamping is carried out. Then, the third cavity Cb' for molding the third semi-finished molded article B' is formed by the recess ~3 of the fixed die 1' and the core 33' of the slide die 30'. At the same time, the first cavity Ca1' for molding the first semi-finished molded article A1' is formed by a recess 15' of the first core 53 and the core 36' of the slide die 30', and the second cavity Ca2' for molding the second semi-finished molded article A2' is formed by the recess 15' of the second core 14 and the core 36' of the slide die 30'.

A plasticized molten resin is injected from a nozzle of an unillustrated injection machine into the respective cavities Cb', Ca1', and Ca2. As a result, the first and second semi-finished molded articles A1' and A2' and the third semi-finished molded article B' are molded substantially simultaneously. The semi-finished molded articles are left in the molding device as they are until they cool and solidify to some degree. This completes the primary molding.

Next, the slide die 30' is opened. When the die is opened, the first and second semi-finished molded articles A1' and A2' respectively remain in the first and second cores 53 and 54, while the third semi-finished molded article B' remains on the slide die 30'. The slide die 30' is subsequently slid to the second position on the upper side in FIG. 4A. Then, the joint faces a and b, and a and a, of the first and second semi-finished molded articles A1' and A2' and the third semi-finished molded article B' are registered, as described above. The first and second cores 53 and 54 are retracted, as shown in FIG. 4B. The fixed die 1' and the slide die 30' are spaced apart from each other, and the first and second cores 53 and 54 have been retracted. Therefore, the joint faces a and a between the first and second semi-finished molded articles A1' and A2', as well as the joint faces a and b between, on the one hand, the first and second semi-finished molded articles A1' and A2' and, on the other hand, the third semi-finished molded article B', are spaced apart with predetermined intervals. Accordingly, the heating module 40' is inserted between these joint faces a and b, and a and a, by the hydraulic piston/cylinder unit 70 to heat and melt these joint faces a and b, and a and a, as described above.

Figure 4B:
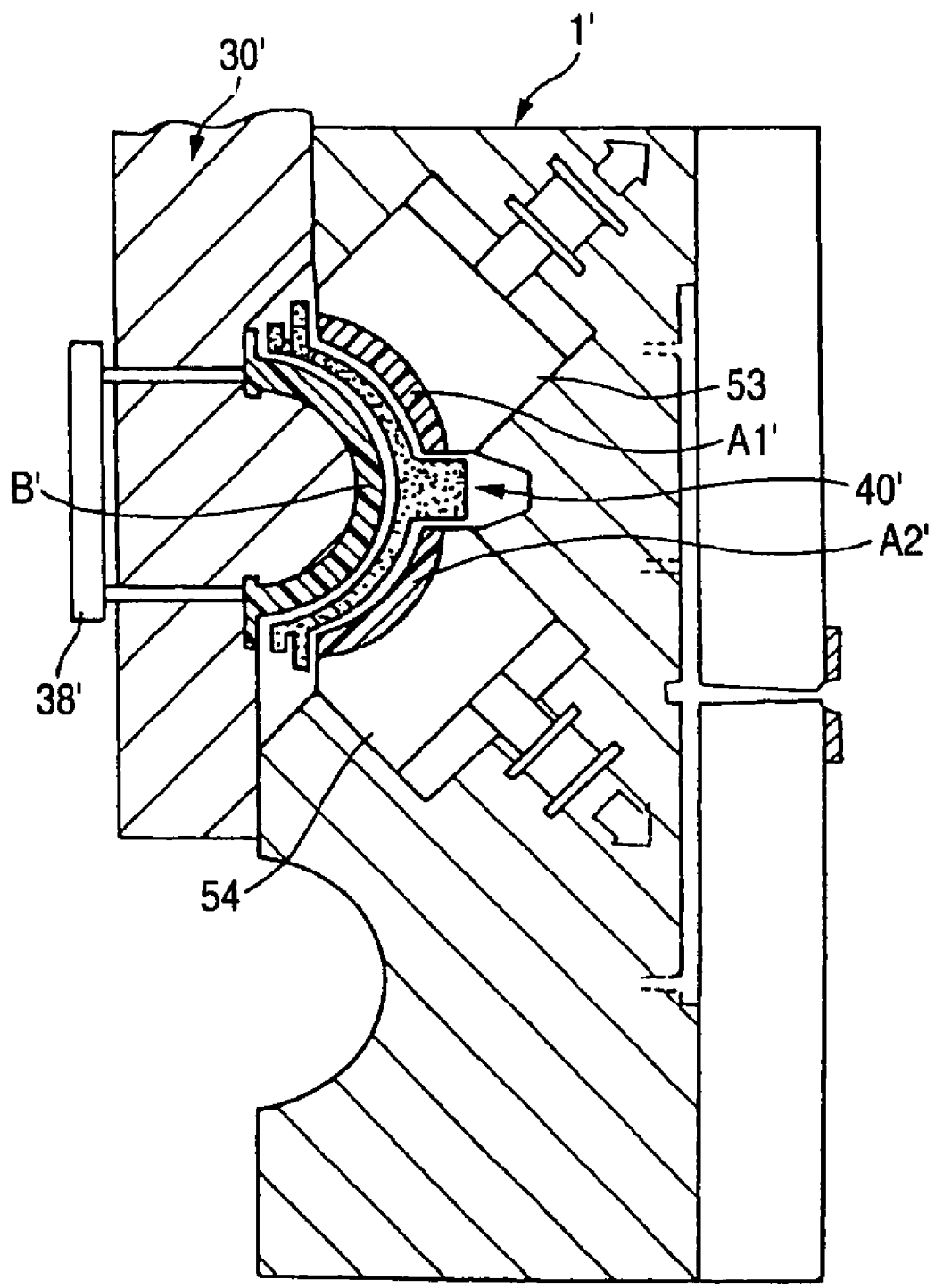

The state in which the heating module 40' is thus inserted or is heating is shown in FIG. 4B. After the joint faces a and b, and a and a, are melted, the heating module 40' is drawn out, and the molding device is clamped. In addition, working oil is supplied to the first and second piston/cylinder units 51 and 52 to drive the first and second cores 53 and 54 in the directions shown in FIG. 4A. As a result of this clamping force, the first and second semi-finished molded articles A1' and A2' and the third semi-finished molded article B' are welded at their joint faces a and b. Also, as the first and second cores 53 and 54, which are inclined inwardly with respect to each other, are driven, the first and second semi-finished molded articles A1' and A2' are welded at their joint faces a and a. The slide die 30' is opened after the semi-finished molded articles are cooled and solidified. Then, the curved pipe C' with the flanges F shown in FIG. 3A projects by means of an ejector 38'. The slide die 30' is slid to the first position shown in FIG. 4A, and primary molding is carried out, as described above. Thereafter, the curved pipe C' is manufactured in the same way.

Figure 3B:
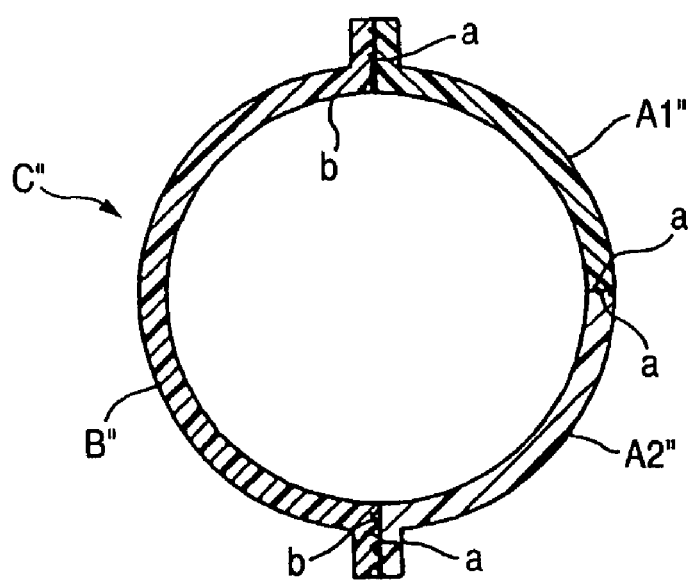

Although in the above-described embodiments a description has been given of examples in which the curved pipes C and C' are manufactured, it is clear that it is possible to similarly manufacture a curved pipe-like hollow article in which ends of the curved pipe C or C' are closed. It is also clear that it is possible to manufacture a spherical hollow article C'' from three semi-finished molded articles A1'', A2'', and B'', as shown in FIG. 3B. Accordingly, molded articles in which a portion is open as in the curved pipes C and C' are also included among the hollow molded articles. In addition, it is also clear that the invention can be implemented by a rotating die instead of the slide die.

What is claimed is:

1. A method of molding a hollow molded article, comprising:

molding first, second, and third arc-shaped semi-finished molded articles each of which has a joint face to be jointed by using a molding device including a fixed die and a movable die capable of closing the molding device;

moving the movable die in which one of the semi-finished molded articles remains with respect to the fixed die so that the respective faces of the first, second, and third semi-finished molded articles are opposed to each other;

inserting a heating module having heating surfaces between the joint faces of the semi-finished molded articles;

causing the heating module to melt the joint faces and retracting the heating module; and press bonding the joint faces by closing the molding device or pressing the semi-finished molded articles inside the molding device.

2. The method of molding a hollow molded article according to claim 1, wherein the heating surfaces are conformed to the shape of the joint faces and are inserted between the joint faces in a non-contact manner to melt the joint faces.

3. A method of molding a hollow molded article, comprising:

molding first to third semi-finished arc-shaped molded articles each of which has a joint face to be jointed by using a molding device including a fixed die, a movable die capable of closing the molding device, and a pair of slide cores fitted to the fixed die;

moving the movable die in which the third semi-finished molded article remains with respect to the slide cores on the fixed die;

moving the slide cores at a predetermined angle so that the respective faces of the semi-finished molded articles are opposed to one another;

spacing apart the joint faces of the first to third semi-finished molded articles;

inserting a heating module having heating surfaces between the joint faces, wherein the heating surfaces are conformed to the shape of the joint faces;

causing the heating module to melt the joint faces and retracting the heating module; and press bonding the joint faces by closing the molding device or pressing the semi-finished molded articles inside the molding device.

4. The method of molding a hollow molded article according to claim 3, wherein the heating surfaces similar to the joint faces are inserted between the joint faces in a non-contact manner to melt the joint faces.

* * * * *